United States Patent [19]
Milkovich et al.

[11] Patent Number: 6,065,337
[45] Date of Patent: May 23, 2000

[54] METHOD AND APPARATUS FOR MEASURING PEDIATRIC BIOMECHANICS

[75] Inventors: Scott M. Milkovich; Daniel K. Stool; Erick Ramos, all of Oak Brook, Ill.

[73] Assignee: Risk Analysis and Management, Oak Brook, Ill.

[21] Appl. No.: 09/182,628

[22] Filed: Oct. 30, 1998

[51] Int. Cl.[7] .................................................. G01L 3/24
[52] U.S. Cl. .......................... 73/379.01; 73/821; 73/865.9
[58] Field of Search .................. 73/810, 821, 830, 73/834, 838, 845, 851, 379.01, 865.8, 865.9, 379.02

[56] References Cited

U.S. PATENT DOCUMENTS

| | | | |
|---|---|---|---|
| Re. 35,598 | 9/1997 | Sadoff et al. | 73/379.01 |
| 4,307,608 | 12/1981 | Useldinger et al. | 73/379.01 |
| 5,467,652 | 11/1995 | Richards | 73/379.01 |
| 5,800,310 | 9/1998 | Jones | 482/8 |

*Primary Examiner*—Max Noori
*Attorney, Agent, or Firm*—Finnegan, Henderson, Farabow, Garrett & Dunner, L.L.P.

[57] ABSTRACT

A pediatric biomechanics model provides accurate information regarding the types and magnitudes of forces that children can apply to products such as toys. The model is used to obtain measurements of the actual forces that children can generate, which permits product designers to design products that will not be easily broken by children. Based on these measurements, manufacturers can design their products to reduce the risk of injury a product may pose to a child as well as to keep the product from breaking.

12 Claims, 2 Drawing Sheets

METHOD AND APPARATUS FOR MEASURING PEDIATRIC BIOMECHANICS

BACKGROUND OF THE INVENTION

A. Field of the Invention

The present invention relates generally to measuring forces on a product, and more particularly to using data measurement devices in a product to determine the types and magnitudes of forces children can exert on the product.

B. Description of the Related Art

A primary concern among manufacturers of products for children is the safety of the children using their products. However, the manufacturers may not always have relevant safety information or the tools to obtain this information regarding a particular product. As a result of not having this information, manufacturers might not make design choices regarding the structure and materials for a product that could most effectively reduce the potential safety hazards of the product.

Another concern for manufacturers of products for children is the strength of a product and its ability to withstand forces applied to it. Manufacturers generally have tools available to them to test different types and magnitudes of forces that can be applied to a product. Using these tools, the manufacturers can determine the tolerances of the product and design or redesign accordingly. The manufacturers, however, may not always anticipate the type of force or how a force will be applied to a product during actual use. Moreover, they may not be able to anticipate the magnitude of forces that a child will be able to apply. Consequently, although the manufacturers may be able to obtain relevant tolerance information for a product, they will be uncertain whether the tolerance is sufficient to protect the product from breaking. As a result, the product may retain potential safety hazards that could have been eliminated if the manufacturer had more accurate information to develop the product.

SUMMARY OF THE INVENTION

Systems and methods consistent with the present invention use pediatric biomechanics models (PBMs) to obtain measurements of the actual forces that children can generate, which permits product designers to design products for children that will not be easily broken by them. In addition, given the realistic information on the actual forces that children generate, the product designer can develop safety reviews of the product independently from government or client specification levels.

To obtain the advantages of, and in accordance with the purpose of the invention, as embodied and broadly described herein, a system for measuring forces applied to an object comprises: at least one transducer, located within the object, for measuring a force applied to the object by a human and for generating a corresponding electrical signal representative of the measured force; an analog bridge, coupled to the transducer, for producing a continuous analog signal corresponding to the electrical signal generated by the transducer; a control unit, coupled to the analog bridge, for receiving and recording the analog signal from the analog bridge and for determining the peak force applied from the received analog signal; and means for determining whether the peak force exceeds a damage threshold of the object.

Both the foregoing general description and the following detailed description provide examples and explanations only. They do not restrict the claimed invention.

DESCRIPTION OF THE DRAWINGS

The accompanying drawings, which are incorporated in and constitute a part of this specification, illustrate embodiments of the invention and, together with the description, explain the advantages and principles of the invention. In the drawings.

DESCRIPTION OF THE PREFERRED EMBODIMENT

Reference will now be made to preferred embodiments of this invention, examples of which are shown in the accompanying drawings and will be obvious from the description of the invention.

The term "mechanics" refers to the science of the interaction of forces on materials or on objects constructed from materials. The term biomechanics refers to the forces that the human body is able to generate. Pediatric biomechanics refers to the forces that children are able to generate. A pediatric biomechanics model, consistent with the present invention, refers to a system for facilitating measurements of pediatric biomechanics.

Figure 1:
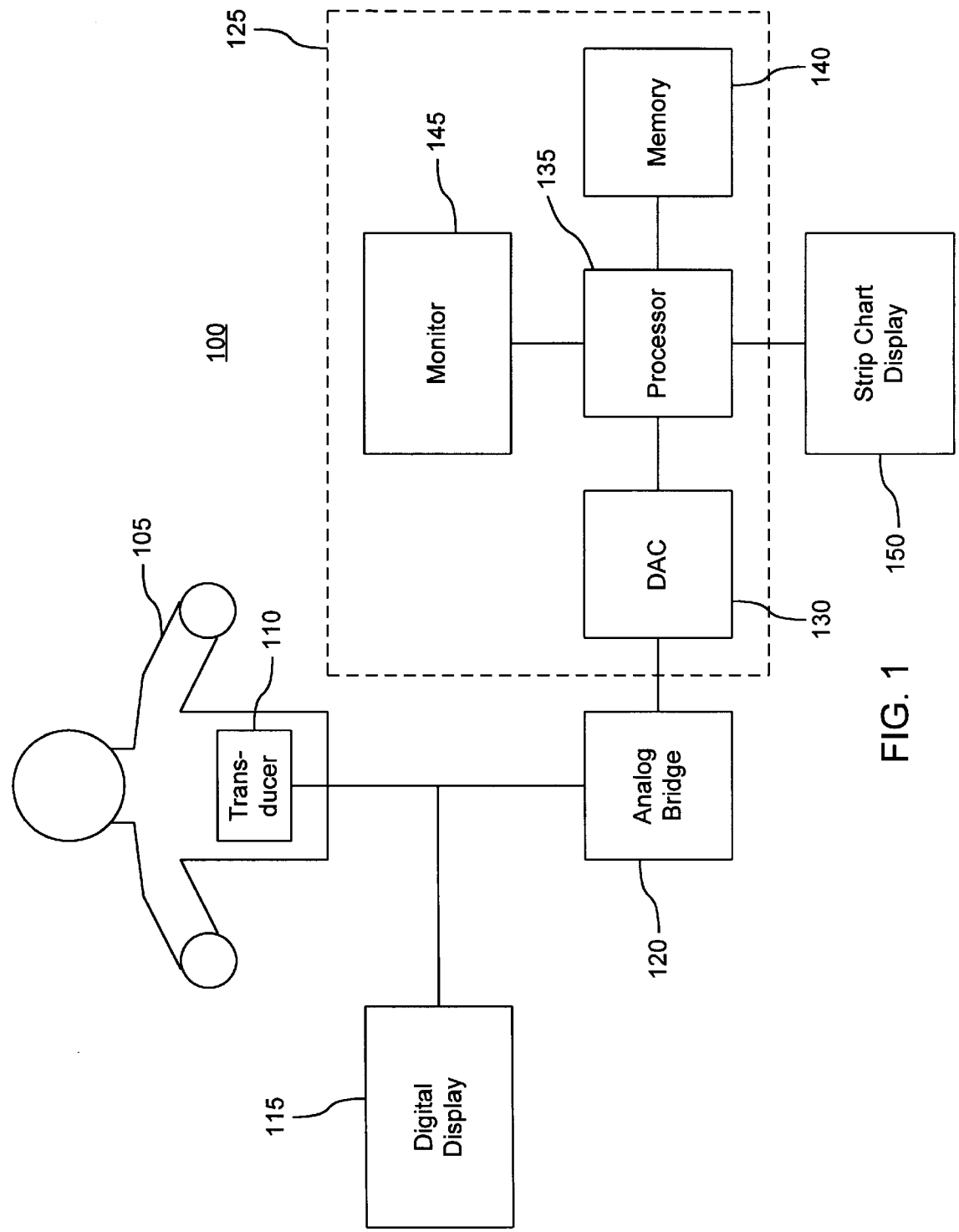
FIG. 1 is a block diagram of a pediatric biomechanics model system consistent with the present invention.

FIG. 1 shows a block diagram of a pediatric biomechanics model (PBM) 100 consistent with the present invention. PBM 100 includes a toy or product 105, which has one or more transducers 110 incorporated within that are able to measure forces applied to product 105. Transducers 110 act as the interface between the force measurement and the child applying the force being measured. Transducers 110 are connected to both a digital display 115, and an analog bridge 120 to facilitate connection to a computer 125. Although digital display 115 and analog bridge 120 are generally hardwired to transducers 110, communication between them can also be provided by wireless transmission.

Analog bridge 120 is connected to computer 125 through a computerized data acquisition & control (DAC) system 130. Computer 125 also includes a processor 135 coupled to DAC 130 and a series of peripheral components known in the art including a memory 140 and a monitor 145. Also coupled to computer 125 is a strip chart display 150.

Transducers 110 can be mounted in a variety of ways depending on the needed force measurement. For example, a transducer mounted in a sports drink bottle could be attached to the spout to measure the force by which children open the bottle closure as they hold it in their teeth and pull with their hands. Transducers 110 can also be placed inside of plush toys, such as between the arms, to measure tension or shear. Alternatively, transducers 110 could be placed inside of a plush toy and attached to an appendage, such as a button to measure the force with which children attempt to remove the button.

In general, each transducer 110 has only one force output, and different transducers are used to measure different forces or to obtain a more compact size. There are several types of forces that can be measured by transducers 110. For example, transducers 110 can measure tension, which is a force that tends to produce elongation or extension. Conversely, transducers 110 can measure compression, which tends to press things together and is the force opposite to tension. Transducers 100 also can measure shear force, a twisting-type of force, which can be described as a condition in or deformation of an elastic body caused by forces that tend to produce an opposite but parallel sliding motion of the body planes. Transducers 110 can also be used to measure a pressure force, which is produced by an act of pressing. Pressure represents a force applied over a surface and is measured as a force per unit area.

Different types of transducers are typically provided to measure the respectively different types of forces. Transducers 110 can be provided from, for example, Omega Engineering, although there are many manufacturers who may supply the necessary transducers. Among the transducers available from Omega Engineering is an LCCA-200 transducer, which measures either tension or compression in terms of pound force. A TQ103-200 transducer measures shear force in terms of inch-pounds. A LCGD-200 transducer measures compression in terms of pound force. A PX302-200AV measures changes in pressure in terms of pounds per square inch (psi). A LCFA-250 is a compact version of the LCCA-200 and also measures tension or compression in terms of pound force.

Digital display 115, connected to transducers 110, generates an easy-to-read output in engineering units of the forces a child is placing on transducer 110. Digital display 115 can be, for example, a DP25-2 display from Omega Engineering. Analog bridge 120, also connected to transducers 110, generates a continuous analog signal that is fed into DAC 130. The analog signal fed into DAC 130 permits computer 125 to record the data being generated and to control the instrumentation. Analog bridge 120 can be, for example, a DMD-465 bridge from Omega Engineering, which makes use of a wheat-stone bridge configuration. Like transducers 110, many firms supply hardware that can be used for digital display 115 and analog bridge 120.

To enhance the portability of PBM 100, DAC 130 may be implemented as a PCMCIA-card based system with computer 125 correspondingly implemented as a laptop computer. For example, DAC 130 can be a DACpad-71B from Advantech, which uses GenieLite software. The software used by DAC 130 is accessed through computer 125 to modify the settings of transducers 110 and to calibrate both digital display 115 and analog bridge 120 using known weights and/or loads. Once the settings have been calibrated, the calibration settings are recorded, such as in memory 140 or in a laboratory notebook, for future reference as well as to check the calibrations prior to making any measurements.

A unique feature of PBM 100 is its flexibility. Transducers 110 are small in size and can be embedded easily into toys or other objects to remove them from the sight of the child and to ensure that the child behaves naturally. In addition, transducers 110 can be configured to allow measurement of a wide variety of forces as described above. The software used for DAC 130 is also very flexible, permitting software settings for each transducer 110, a display in engineering units on digital display 115, a continuous force versus time display on strip chart type display 150, and the recording of raw data, peak data (i.e., the maximum or minimum values achieved by the child) and duration data (the duration in time of the force that the child was able to generate.)

An important feature of PBM 100 is the approach to taking measurements. Obtaining accurate data of the maximum exertion of a child is difficult. As a result, it is critical in designing PBM 100 to include features on product 105 in light of the development level of, for example, a 5-year-old, or the manner in which you convince a 3-year-old to "pull as hard as you can." In order to ensure fulfillment of these ideals, product 105 could include feedback systems that encourage children to exert maximum forces. For example, a sound could be generated that would increase in intensity or change in pitch in relation to the level of force being applied, or a series of lights (LEDs) could be illuminated also as a function of the force being applied.

Once the necessary data has been obtained regarding the forces that children can apply to a toy using PBM 100, the data can then be applied to effectively redesign the toy to make it safer. The information obtained can include some or all of the following: force in units of pounds (lbs.) of tension or compression; inch-pounds (in-lbs.) of shear; or pounds per square inch (psi) of pressure. All of these engineering measurements could be converted to other English-units or to SI-units (also termed metric). The time can be in units of seconds (sec), including both rise time (time needed to obtain maximum load), and duration time (the length of time that the load can be maintained). Using the force and time information, energy expended could be calculated by integrating the area under the force vs. time curve. The units of energy could be ergs. Statistical information can also be obtained, such as an average force applied, or an average time over which a load is applied, etc.

All data is preferably obtained by one of two methods. A first method records the peak reading on digital display 115, which is only a measurement of the maximum or minimum force expended by the child. The other method records the data via DAC 130, which gives a complete force vs. time history and allows most of the calculations cited above.

The statistical data can be practically applied to improve the safety features of toys and products used by children. For example, the data enables the creation of computer or physical models which mimic the behavior and forces generated by children. In addition, the data can be used to create new standards based on the physical capability of children, as opposed to the engineering estimate method commonly in use now.

A very important use of one measure of the statistical data is the peak data for each type of force being applied. In particular, the peak data provides an indication of the maximum forces that can be expected to be placed upon the product. Consequently, manufacturers can then test their products to determine if the product can withstand such a force without breaking or being damaged. This tolerance limit can be termed the damage threshold of the product. By developing a product to have a damage threshold that exceeds the maximum forces that can be expected to be applied to the product, manufacturers can eliminate potential safety hazards that result from broken products, particularly toys, and thus protect children using the products from harm.

Figure 2:
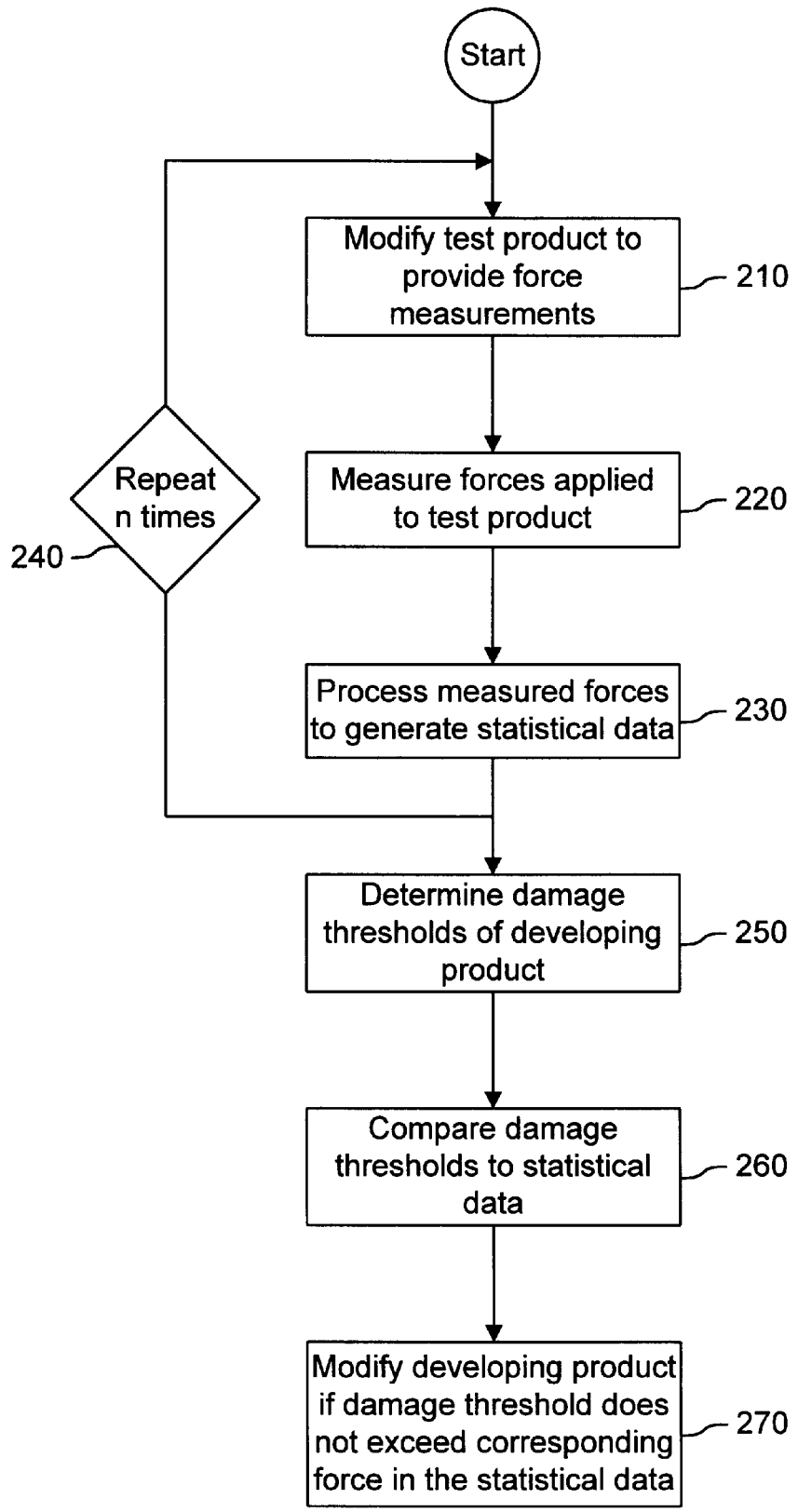
FIG. 2 is a flow chart for a process of determining forces applied to a product consistent with the present invention.

FIG. 2 shows a flow chart of a process of determining pediatric biomechanics consistent with the present invention. The first step in the process is to modify a test product or toy to enable the measurement of forces (step 210). The test product can be modified in several different ways to allow for the measurement of different types of forces including tension, compression, shear and pressure forces. In addition, the test product is preferably modified to include transducers 110 to provide the measurement of forces, which can be made and recorded in conjunction with the rest of PBM 100 as shown in FIG. 1. Other modifications to the test product can be made to facilitate obtaining more accurate data, such as by adding feedback systems like sound and lights responsive to the forces being applied that encourage children to exert maximum forces.

Once the test product has been modified, the test product is used to measure the forces that can be applied to it (step 220). Generally, separate measurements are made for each of the different types of forces. For each type of measurement made, a continuous force versus time is recorded, for example, in memory 140.

After all of the forces have been measured, an analysis of the recorded data is performed to develop statistical data including peak data representing both maximum and minimum forces, as well as duration time and rising time of a force (step 230). The recorded data can also be used to calculate average forces and energy expended. The application of forces and generation of statistical data is preferably performed for a large cross-section of n children, n corresponding to the number of children tested (step 240). The cross-section of children can be divided into subsets based on the age of the child. In addition, the application of forces and generation of statistical data can be performed for a variety of test products to provide a more complete analysis. The totality of the statistical data based on the cross-section of children and variety of test products can be used as a database that provides very accurate information regarding what forces can be applied by children.

Based on this statistical information, manufacturers can then perform tests to determine the damage thresholds of a new product by applying forces equivalent to those provided in the database of statistical information (step 250). The damage thresholds correspond to the limit to which a product can withstand a particular force without breaking. Thus, there are different damage thresholds for the different types of forces. In addition, there also may be different damage thresholds for each type of force applied. For example, a damage threshold for a peak tension force may be different than a damage threshold for a constant or rising tension force applied continually over a period of time.

After the damage thresholds for the product have been determined, a comparison of the damage thresholds is made against the statistical data to determine whether or not each damage threshold exceeds the corresponding force in the statistical data (step 260). If a damage threshold fails to exceed the corresponding force, then the new product can be redesigned to increase the damage threshold (step 270). By increasing the damage threshold to exceed the corresponding force in the statistical data, the redesigned product is likely to withstand the forces that can be reasonably expected to be applied to it. Thus, as a result of having accurate data regarding the types and magnitudes of forces that children can generate, manufacturers can test a product to determine if the product can withstand these forces and redesign accordingly, which reduces the chance of a product breaking and the potential harm the product poses to a child.

It will be apparent to those skilled in the art that various modifications and variations can be made to disclosed embodiments of the present invention without departing from the scope or spirit of the invention. Other embodiments of the invention will be apparent to those skilled in the art from consideration of the specification and practice of the embodiments of the invention disclosed herein. The specification and examples should be considered exemplary, with the true scope and spirit of the invention being indicated by the following claims and their full range of equivalents.

What is claimed is:

1. A system for measuring forces applied to an object, comprising:

at least one transducer, located within the object, for measuring a force applied to the object by a human and for generating a corresponding electrical signal representative of the measured force;

an analog bridge, coupled to the transducer, for producing a continuous analog signal corresponding to the electrical signal generated by the transducer;

a control unit, coupled to the analog bridge, for receiving and recording the analog signal from the analog bridge and for determining the peak force applied from the received analog signal; and means for determining whether the peak force exceeds a damage threshold of the object.

2. The system of claim 1, wherein the transducer includes means for measuring one of a compression, a tension, a shear and a pressure force.

3. The system of claim 1, further comprising:

means for adjusting the damage threshold of the object if the peak force exceeds the damage threshold.

4. The system of claim 1, further comprising:

a digital display, coupled to the transducer, for displaying the electrical signal representative of the measured force.

5. A method for designing a developing product, comprising the steps of:

inducing a human to apply at least one force to a test object at their maximum capability;

determining the maximum magnitude of the force applied to the test object;

applying an increasing value of a force to the developing product to determine a damage threshold of the developing product; and determining whether the maximum magnitude of the force applied to the test object exceeds the damage threshold of the developing product.

6. A method according to 5, further comprising the step of:

modifying the developing product so that the damage threshold of the developing product exceeds the maximum magnitude of the force applied to the test object.

7. A method according to 5, further comprising the step of:

modifying the test object by affixing a transducer thereto for measuring the force applied to the test object.

8. A method according to 7, wherein the step of modifying the test object includes the substep of affixing a transducer to the test object for measuring one of a tension, a compression, a shear, and a pressure force.

9. A method according to claim 5, wherein the step of inducing a human to apply a force includes the substep of providing feedback to the human responsive to the magnitude of the force applied by the human to the test object.

10. A method according to claim 5, wherein the step of applying a force to the developing product includes the substep of applying the force to an appendage of the developing product.

11. A method according to claim 10, wherein the step of applying the force to an appendage includes the substep of applying the force until the appendage is removed from the developing product, wherein the force at which the appendage is removed from the developing product corresponds to the damage threshold.

12. A method according to claim 9, wherein the substep of providing feedback includes the substep of increasing the intensity of a sound in correspondence with the magnitude of the force applied by the human to the test object.

* * * * *